3,358,025
PROCESS OF RECOVERING 4,4'-METHYLENE-DI(ORTHO-ANILINES)
Ebenezer A. T. Foster, Cheshire, Alec Odinak, New Haven, and Adnan A. R. Sayigh, North Haven, Conn., assignors to The Upjohn Company, Kalamazoo, Mich., a corporation of Delaware
No Drawing. Filed Sept. 14, 1964, Ser. No. 396,357
3 Claims. (Cl. 260—570)

ABSTRACT OF THE DISCLOSURE 4,4'-methylenedi(o-substituted anilines) are prepared in increased yield and with improved ease of processing by condensing formaldehyde and the appropriate o-substituted aniline in the presence of aqueous sulfuric acid. The desired product separates from the reaction product as the insoluble sulfate and is readily isolated. The diamines are intermediates for the corresponding diisocyanates.

This invention relates to the preparation of 4,4'-methylenedianilines and is more particularly concerned with an improved process for the preparation of such compounds from ortho-substituted anilines.

Methods for the preparation of 4,4'-methylenedianilines by condensation of the appropriate aniline and formaldehyde are well-known in the art. In particular, it is known that anilines, including ortho-substituted anilines, can be condensed with formaldehyde in the presence of hydrochloric acid; see, for example, U.S. Patent 2,818,433. In such prior art processes, it has been customary to separate the desired product from the reaction mixture by basifying the reaction mixture and recovering the desired product by steam distillation; see, for example, U.S. Patent 2,974,168.

The yields obtained using ortho-substituted anilines in such processes have been disappointing. Recently, interest in the preparation of 4,4'-methylenedi(o-substituted aniline) has been renewed because of the use of these compounds as intermediates for the preparation of the corresponding diisocyanates. The latter compounds are finding rapidly increasing use in the preparation of polyurethanes by reaction with suitable polyols in the presence of catalysts.

The present invention is concerned with an improvement in the prior art processes which improvement results in considerable reduction in the cost of production of 4,4'-methylenedi(o-substituted anilines). This improvement in turn is reflected in significant reduction in the cost of the preparation of the corresponding diisocyanates.

The improvement which is the subject of the present invention consists in carrying out the condensation of the o-substituted aniline and formaldehyde in a reaction medium comprising aqueous sulfuric acid. The reaction product separates in the form of its sulfate from the reaction mixture upon cooling and can be removed from the reaction mixture by conventional procedures, such as filtration. The separation of the desired sulfate from the reaction mixture is substantially quantitative. Hence, it is unnecessary to apply the prior art procedure of basification followed by steam distillation and it is also unnecessary to employ any other procedure to separate the desired compound from unchanged aniline which separation is always required in the prior art procedures.

Further, the improved process can be adapted readily to use on a semi-continuous basis. Thus, in a preferred embodiment of the invention the aniline is employed in substantial excess of molar proportion in respect to the formaldehyde, and the mother liquor, obtained after separation of the desired product as its sulfate, contains unreacted aniline. This mother liquor can be used as reaction medium in a second batch it being necessary merely to charge further quantities of aniline, formaldehyde and sulfuric acid to the mother liquor before repeating the whole reaction process. This cycle of condensation, separation of product and re-use of mother liquor, can be repeated as long as desired, and leads to considerable reduction in the cost of labor and raw materials, thus contributing still further to the reduction in cost of the desired final product.

Accordingly, the present invention, in one aspect, relates to an improved process for the preparation of 4,4'-methylenedi(ortho-substituted aniline) which comprises the steps of condensing formaldehyde with an ortho-substituted aniline having no substituents in the para position in the presence of aqueous sulfuric acid at an elevated temperature, cooling the reaction mixture to a temperature between about 0° C. to 45° C., preferably from about 5° C. to about 25° C. and isolating the 4,4'-methylenedi(ortho-substituted aniline) sulfate which separates.

The invention in a further aspect comprises carrying out the process defined above and charging to the mother liquor from the separation of the first reaction product further quantities of ortho-substituted aniline, formaldehyde, and sulfuric acid and repeating a plurality of times the cycle of condensation, isolation of the desired product and re-use of the mother liquor.

The condensation of formaldehyde and ortho-substituted aniline according to the process of the invention is advantageously carried out at a temperature within the range of about 60° C. to about 100° C. The reactants can be mixed in any order but a particularly advantageous procedure comprises dissolving the aniline in the aqueous sulfuric acid and then adding the formaldehyde to the resulting solution. The process of dissolving the aniline in the sulfuric acid is normally exothermic and it is generally necessary to apply cooling to prevent the temperature from rising excessively i.e. to maintain the temperature of the mixture below 100° C. The formaldehyde can be added to the solution of aniline in sulfuric acid at room temperature (of the order of 25° C.) but it is preferably added while the aniline solution is maintained at a temperature from 60° C. to 100° C. The formaldehyde can be added in any of the various forms in which it is normally available including paraformaldehyde, but is preferably added in the form of its concentrated aqueous solution.

The reaction period varies according to the nature of the reactants and the temperature employed and is generally of the order of 1 to 5 hours. When reaction is complete the reaction mixture is allowed to cool, by application of external cooling if desired, to a temperature within the range of about 0° C. to about 45° C. preferably within the range of about 5° C. to about 25° C. The desired product separates in the form of its insoluble sulfate and can be removed from the mixture by conventional procedures such as filtration.

The proportion of ortho-substituted aniline employed in the above condensation is advantageously greater than stoichiometric. Preferably the substituted aniline is employed in an amount of about 4.0 to about 6.0 moles per mole of formaldehyde. The amount of sulfuric acid employed is advantageously of the order of about 0.5 to about 1.0 mole per mole of aniline. Preferably the sulfuric acid is employed in the proportion of about 1.0 mole per mole of aniline i.e. sufficient so that the aniline employed in the reaction mixture is present initially as the acid sulfate. The amount of water present in the sulfuric acid can vary over a wide range. Advantageously the water is present in an amount within the range of about 0.5 to about 2.0 liters per mole of aniline; the preferred range is of the order of about 1.0 to about 1.2 liters per mole of aniline. For any particular substituted aniline the most satisfactory concentration of sulfuric acid can readily be determined experimentally.

The ortho-substituted anilines employed in the process of the invention have no substituents in the para position and have at least one of the ortho positions substituted by one of the following groups: lower-alkyl, lower-alkoxy, halogen, carboxy, lower-alkoxycarbonyl and nitro. Where both ortho positions are substituted only one of these substituents may be nitro, carboxy, or alkoxycarbonyl.

The term "lower-alkyl" means alkyl from 1 to 8 carbon atoms inclusive, such as methyl, ethyl, propyl, butyl, pentyl, hexyl, heptyl, octyl, and isomeric forms thereof. The term "halogen" means chlorine, bromine, fluorine and iodine. The term "lower-alkoxycarbonyl" means the group

wherein R represents lower-alkyl as defined above.

The process of the invention, as discussed above, enables 4,4'-methylenebis(ortho-substituted anilines) to be prepared in higher yields than heretofore and with substantially simplified operating procedures. Surprisingly the process of the invention when applied to the condensation of aniline itself with formaldehyde shows no advantages over the prior art methods. The improvements in yield and in operating procedure discussed previously are limited to the use in the condensation of the small class of ortho-substituted anilines defined above.

The process of the invention is of particular value in the condensation of formaldehyde and 2-chloroaniline to give 4,4'-methylenebis(2-chloroaniline) but it is to be understood that the scope of the invention is not limited to the use of this particular aniline but extends to the various o-substituted anilines defined above.

The following examples describe the manner and process of making and using the invention and set forth the best mode contemplated by the inventors of carrying out the invention but are not to be construed as limiting.

*Example 1.—4,4'-methylenebis(2-chloroaniline)*

With careful, effective mixing 127.6 g. (1 mole) of 2-chloroaniline, 1150 ml. of water and 100 g. of sulfuric acid were combined. The volume of the reaction mixture was 1300 ml. The temperature was raised to about 75° C. and 20.3 g. (0.25 mole) of 37% aqueous formaldehyde was added over about a 40 minute period. After the formaldehyde addition was complete, the temperature was increased to about 95° C. and held there for about three hours. The resulting mixture was allowed to cool to room temperature, whereupon crystallization began and was complete after standing for about 15 hours. The solid, sulfuric acid salt of 4,4'-methylenebis(2-chloroaniline) was isolated by filtration at room temperature. The precipitate so obtained was slurried in water and the slurry was made alkaline with sodium hydroxide. The solid which separated was isolated by filtration, washed with water and dried to yield 48.2 g. of pure 4,4'-methylenebis(2-chloroaniline) having a melting point of 105 to 108° C. The yield amounted to 72.2% of theory based on formaldehyde.

The mother liquor remaining from the filtration of the 4,4'-methylenebis(2-chloroaniline) sulfate was analyzed for acid content and sufficient sulfuric acid was added to increase its acid content to 100 g. To this liquor was added 63.8 g. (0.5 mole) of 2-chloroaniline followed by sufficient water to increase the batch size to 1300 ml. The reaction mixture was heated to 75° C. and 20.3 g. (0.25 mole) of 37% formaldehyde was added over about a forty minute period. After the formaldehyde addition was complete, the temperature was increased to about 95° C. and held there for about three hours. Thereafter, the reaction mixture was allowed to stand at room temperature whereupon the sulfuric acid salt of 4,4'-methylenebis(2-chloroaniline) precipitated and was separated by filtration. The sulfate so obtained was converted to the free base by neutralization with sodium hydroxide and isolated as described above. The mother liquor was used again as in the previous preparation.

The procedure whereby the mother liquor was employed as a partial source of starting material (I) and the sulfuric acid and formaldehyde content of the reaction mixture supplemented was repeated six additional times to make a total of eight preparations using a total of 303.8 g. (3.1 moles) concentrated sulfuric acid, 571.5 g. (4.5 moles) of o-chloroaniline and 163 grams (2 moles) of a solution containing about 37% of formaldehyde in water. There was thus obtained a total of 465.8 g. or 87.2% of theory, based on formaldehyde, of 4,4'-methylenebis(2-chloroaniline) melting at 105 to 108° C.

The reaction described in the above example was repeated using aniline in place of 2-chloroaniline. The yield of 4,4'-methylenedianiline so obtained was very low and the product contained a high percentage of by-products.

We claim:

1. In a process for the preparation of 4,4'-methylenedi(o-chloroaniline) by condensation of formaldehyde with o-chloroaniline the improvement which consists of carrying out the condensation in aqueous sulfuric acid at 60° C. to 100° C. and separating 4,4'-methylenedi(o-chloroaniline) from the cooled reaction medium in the form of a precipitate of the 4,4'-methylenedi(o-chloroaniline) sulfate.

2. A semi-continuous process for the preparation of 4,4'-methylenedi(o-chloroaniline) which consists of the steps of condensing formaldehyde and o-chloroaniline in aqueous sulfuric acid solution at a temperature within the range of 60° to 100° C. said o-chloroaniline being present in excess of stoichiometric proportions, cooling the reaction mixture to a temperature within the range of about 0° C. to about 45° C. isolating the 4,4'-methylenedi(o-chloroaniline) sulfate which has separated, adding a further charge of o-chloroaniline, formaldehyde and sulfuric acid to the mother liquor after isolation of said sulfate, and repeating a plurality of times the same sequence of condensation followed by separation of 4,4'-methylenedi-(o-chloroaniline).

3. In a process for the preparation of 4,4'-methylenedi-(2-chloroaniline) by condensation of 2-chloroaniline and formaldehyde, the improvement which consists of carrying out the condensation of 1 molar proportion of formaldehyde and from about 3.0 to about 5.0 molar proportions of 2-chloroaniline in the presence of approximately 1 mole of aqueous sulfuric acid per mole of aniline at a temperature within the range of about 60° C. to about 100° C. cooling the reaction mixture to a temperature within the range of about 0° C. to about 45° C. isolating the 4,4'-methylenedi(2-chloroaniline) sulfate which separates, and liberating the desired 4,4'-methylenedi(2-chloroaniline) from the isolated sulfate by basification.

References Cited

UNITED STATES PATENTS

| | | |
|---|---|---|
| 763,756 | 6/1904 | Homolka et al. _____ 260—570 |
| 2,257,481 | 9/1941 | Pollak. |
| 2,818,433 | 12/1957 | Erickson _____ 260—570 |
| 3,274,226 | 9/1966 | Long et al. _____ 260—570 X |

CHARLES B. PARKER, *Primary Examiner.*

R. V. HINES, *Assistant Examiner.*